(12) United States Patent
Sequeira

(10) Patent No.: US 10,525,383 B2
(45) Date of Patent: Jan. 7, 2020

(54) DEVICE FOR FILTERING ROLLING OIL

(71) Applicant: FIVES DMS, Noyelles-les-seclin (FR)

(72) Inventor: David Sequeira, Wavrin (FR)

(73) Assignee: FIVES DMS, Noyelles-les-Seclin (FR)

( * ) Notice: Subject to any disclaimer, the term of this patent is extended or adjusted under 35 U.S.C. 154(b) by 111 days.

(21) Appl. No.: 15/521,809

(22) PCT Filed: Oct. 20, 2015

(86) PCT No.: PCT/FR2015/052820
§ 371 (c)(1),
(2) Date: Apr. 25, 2017

(87) PCT Pub. No.: WO2016/066926
PCT Pub. Date: May 6, 2016

(65) Prior Publication Data
US 2017/0239596 A1    Aug. 24, 2017

(30) Foreign Application Priority Data

Oct. 28, 2014  (FR) ..................................... 14 60335

(51) Int. Cl.
*B01D 29/52*      (2006.01)
*B21B 1/22*       (2006.01)

(52) U.S. Cl.
CPC ............... *B01D 29/52* (2013.01); *B21B 1/22* (2013.01); *B01D 2201/0446* (2013.01); *B21B 2001/221* (2013.01)

(58) Field of Classification Search
CPC .. B01D 29/52; B01D 2201/0446; B21B 1/22; B21B 2001/221
See application file for complete search history.

(56) References Cited

U.S. PATENT DOCUMENTS 5,356,495 A * 10/1994 Wyatt-Mair ............ B21B 3/003
148/440

FOREIGN PATENT DOCUMENTS

CN        103191600 A    7/2013

OTHER PUBLICATIONS

Yue (CN 103191600 original and translation attached) (Year: 2013).*
Dekarheo-Back-flushable filter cartridges for rolling oil filtration in stainless steel cold rolling mills (Year: 2013).*

* cited by examiner

*Primary Examiner* — Liam Royce
(74) *Attorney, Agent, or Firm* — Young & Thompson

(57) ABSTRACT

Device for filtering rolling oil, including: a tank having an inlet for the oil to be filtered, as well as a lid having at least one plate element, or a plurality of plate elements, removably stacked in the internal volume of the tank, able to be removed from the tank via the upper opening of the lid, each of the plate elements removably receiving filtration cartridges, each of the hollow plate elements constituting a collector for oil filtered by the cartridges of said plate element, each of the plate elements comprising a filtered oil outlet removably connected to a corresponding outlet of the tank via a connector. According to the invention, there are between one and three plate elements, the total number of filtration cartridges of the device is between 500 and 3000 cartridges, and is suitable to allow a nominal filtration flow of between 1000 L/min and 4000 L/min.

19 Claims, 4 Drawing Sheets

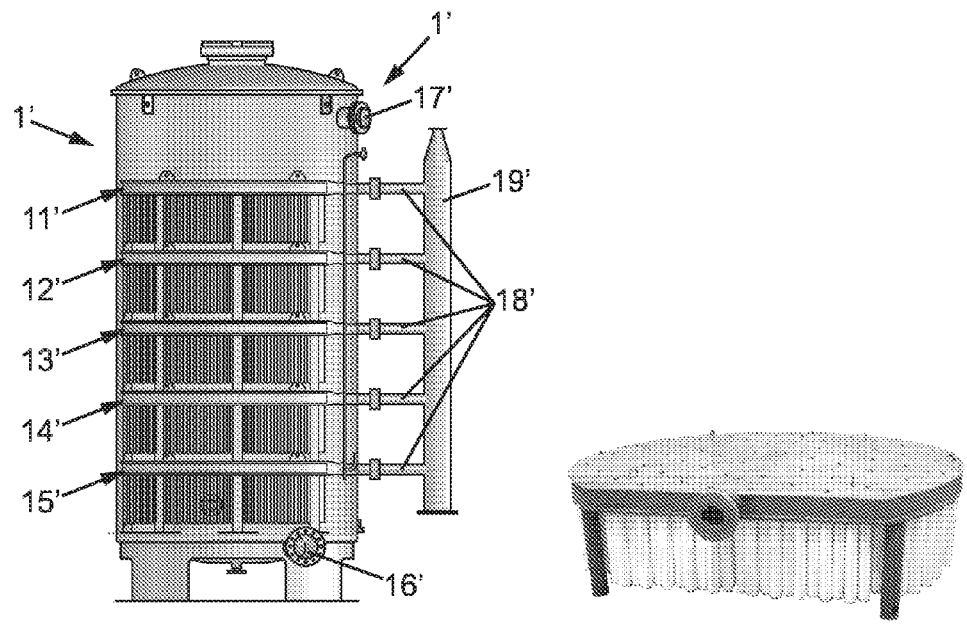
FIG. 2 (E.T)   FIG. 2 (a)
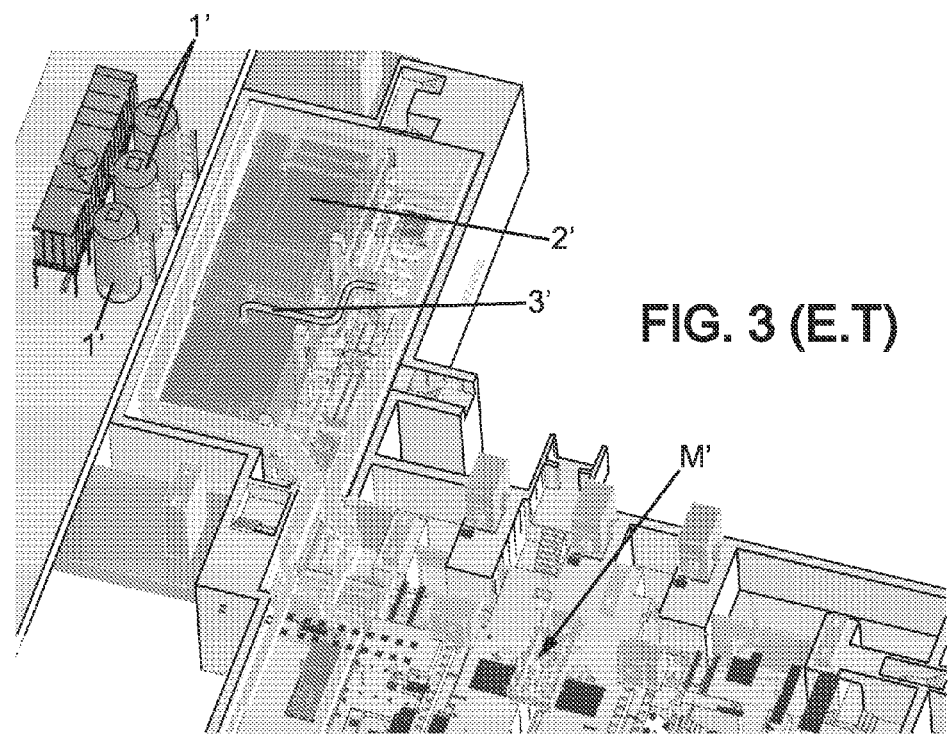
FIG. 3 (E.T)

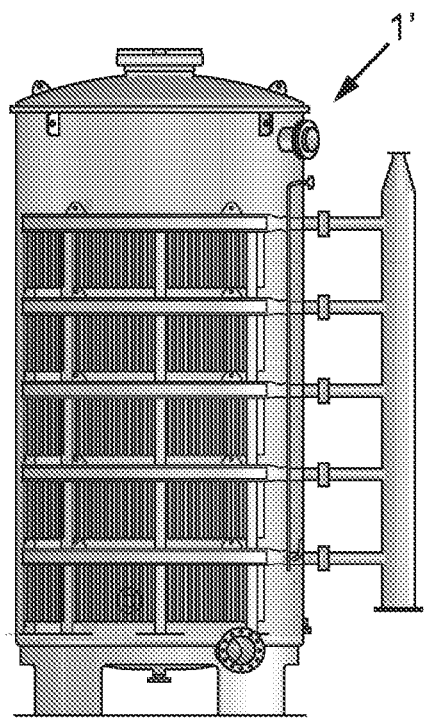
FIG. 4 (E.T)
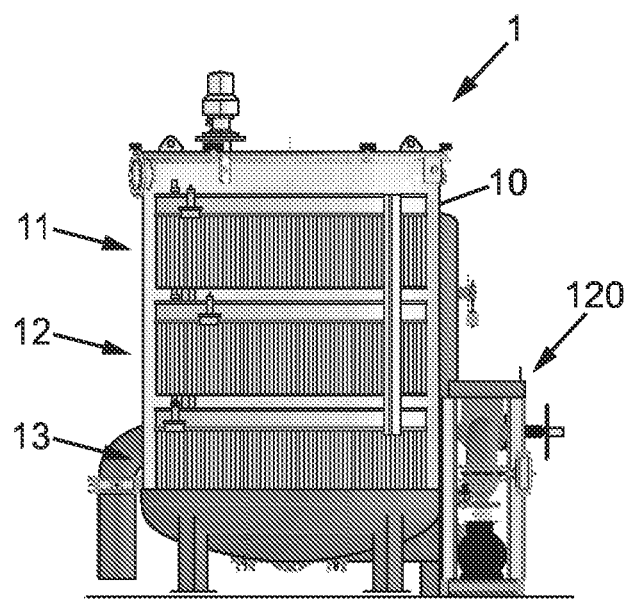
FIG. 5 (INV)

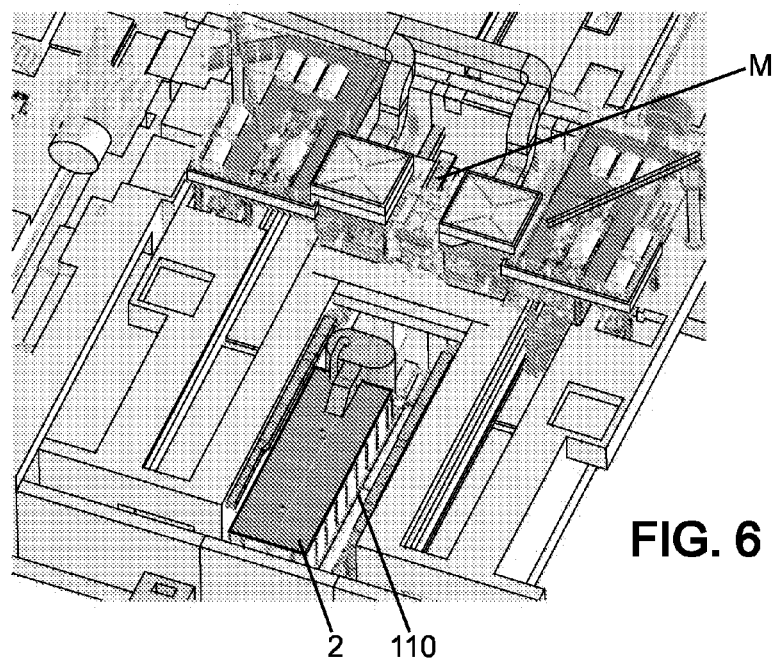
FIG. 6 (INV)
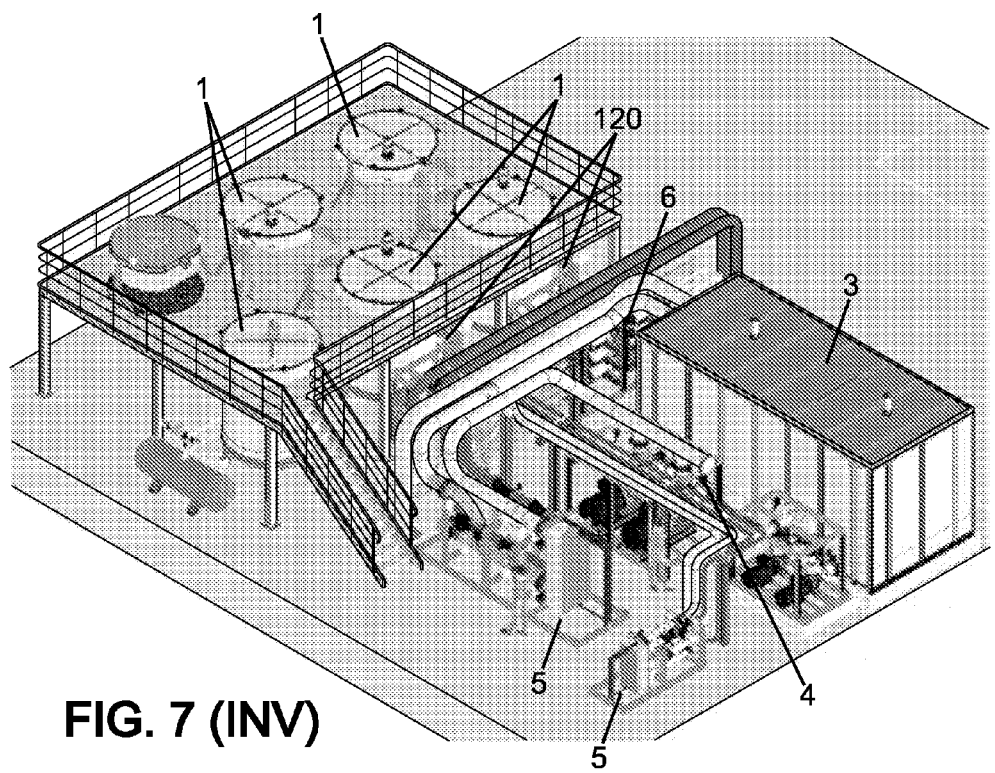
FIG. 7 (INV)

DEVICE FOR FILTERING ROLLING OIL

The invention concerns a rolling oil filtration device, of a plate-type device, as well as a rolling oil recycling and filtration facility equipped with such a filtration device.

BACKGROUND OF THE INVENTION

The field of the invention is that of rolling oil filtration in cold-rolling mills, and more specifically "Sendzimir" rolling mills, in particular twenty-cylinder rolling mills, known under the name "20-Hi" for a person skilled in the art; an example of the embodiment of such a twenty-cylinder rolling mill is illustrated in the documents U.S. Pat. Nos. 5,193,377 and 5,471,859. In such a rolling mill, the cylinders are distributed into one lower group and one upper group; more specifically, these groups present a symmetrical structure and each comprise ten cylinders of which: one working cylinder, two first intermediate cylinders, three second intermediate cylinders, and four support cylinders, or support rollers, which are outside of the arrangement.

In a rolling mill, in particular in a 20-cylinder rolling mill, rolling operations are carried out by projecting the oil over the cylinders and the strip. This lubrication and/or cooling operation is implemented by a recycling facility which comprises, successively, positioned between a rolling mill dirty oil outlet and an inlet for clean oil, a circuit comprising:
 a dirty oil tank,
 a cartridge filtration system,
 a clean oil tank.

A first pumping system, upstream the filtration system following the direction of the oil flow, is joined to the filtration system and enables oil to flow to the filtration system.

A second pumping system, located downstream the filtration system, enables the oil to be sucked through the filtering medium and the push the recirculated oil to the clean oil tank.

A third pumping system, located downstream the clean oil tank, enables oil to flow to the rolling mill. Such general architecture of the recycling and filtration facility is known from document CN 203355436U, and is implemented industrially for 20-cylinder rolling mills from the 1970s. Traditionally, the facility can again comprise exchangers intended to control the temperature of recycled oil as well as control valves enabling the fluid flow to be controlled before it enters the rolling mill.

Since this date, it is known to use, for the filtration system, several plate filtration devices, often known by a person skilled in the art under the name "Supamic Filter", from the name of its original manufacturer, and positioned on the circuit in a way to achieve oil filtration at the same time. Such a plate filtration device is illustrated in a diagram in FIG. 1 of the document CN 203355436U, identified by marker 5.

The document CN 203154922U describes in more detail the structure of a plate filtration device typically used for filtering Sendzimir rolling mills from the 1970s.

Such a filtration device comprises a tank, typically cylindrical inside which several removable "plates" are superimposed, spread out over the height of the tank, and stacked on top of each other, using base systems. Each one of the plate elements is a hollow element, whereon a large number of filtration cartridges are fixed, parallel, typically by screwing from the upper edge of the cartridge onto the corresponding threaded parts of the plate.

The tank comprises an inlet opening for dirty oil, the filtration being achieved through the filtering medium of the cartridge, from outside to inside, the oil filtered by the cartridge being collected in the plate, which is a hollow element, then led to a plate outlet for clean oil. The oil outlets of different plates are respectively connected, watertight, at openings spread out over the height of the tank, using flange sets.

At the end of a certain time of functioning, it is necessary to replace the cartridges of the filtration device; according to the current procedure, the operator starts by opening the lid, on the upper edge of the tank, then removes the different plates, one by one, using a lifting system, of the highest plate, and to the last plate at the bottom of the tank. Once the plate is removed outside of the tank, the different cartridges can be unscrewed and replaced. For each plate, and prior to the operation of lifting the plate, the operator must necessarily go down into the tank to unscrew the screws of the flange sets and remove the seals between the oil outlet of the plate and the corresponding opening of the tank.

In the cold-rolling mill facilities, in order to obtain the desired filtration flow, typically between 4,000 l/min and 27,000 l/min according to the size of the rolling mill, it is known to use several filtration devices at the same time, each one with four or five plates, the number of cartridges per plate typically being 800. Such a size is, to the inventor's knowledge, still used since the 1970s in these rolling oil recycling facilities and with the aim of reducing the total number of filtration devices per recycling facility.

Thus, and still today, the applicant manufactures such five-plate filtration devices, with a diameter of 2.4 meters and a height of 6.1 meters. Each plate holds 832 cartridges, each one with a length of 13 inches (that is a length of 33.02 cm). The useful volume of the tank is around 18 m$^3$.

The filtration cartridges used often comprise a nylon or fibreglass-based filtering medium. In order to extend the lifespan of the cartridges, back flushable-type filter cartridges are used.

The unclogging of cartridges is carried out at regular time intervals, and is implemented, on plate filtration devices, one by one. For this purpose, a fluid back flush is implemented, typically with compressed air, on one of the plate filtration devices, and while the other plate filtration devices, positioned parallel, ensure the filtration of the rolling oil. For each device, the unclogging is implemented plate by plate, and not simultaneously on all the cartridges of different plates. According to the inventor's observations, the higher the number of plates, the more time needed for the cycle to unclog the cartridges. For example the time necessary to unclog the cartridges of one single filtration device is around 30 minutes when there are five plates.

During the implementation of this unclogging, the filtration capacity of the facility is cut down by that of one device, the overall filtration flow of the facility decreasing. The dirty oil and clean oil reservoirs thus constitute buffer reservoirs, enabling a constant nominal oil flow to the rolling mill: in concrete terms and during the implementation of the back flush, the oil level in the dirty oil reservoir increases, and the level in the clean oil reservoir decreases, these two reservoirs being sized, of sufficient volume, in a way to allow these variations in volume.

More specifically, the volume of the clean oil reservoir is directly related to the time parameters and flow variation, due to the unclogging of a filtration device.

Thus, if:
 the parameter T represents the time needed to unclog the cartridges of a filtration device and, the parameter ΔD, the fall in filtration flow, then the clean oil reservoir must be of sufficient volume in a way to maintain a constant nominal flow to the rolling mill, by comprising the fall in filtration flow for the whole unclogging time T: the volume of this reservoir is therefore at least equal to a volume equal to T×ΔD (plus a safety margin) and in order to ensure a constant oil flow to the rolling mill. The dirty oil reservoir must be able to hold such a volume of fluid. Further still, the dirty oil reservoir must still be used, when maintaining on all the filtration devices, as a container when the tanks of different devices are fully emptied: in such a case where the volume of the dirty oil reservoir must be at least equal to the sum of the useful volumes of the tanks of different filtration devices.

Thus, according to the inventor's observations, state of the art recycling facilities are a very significant volume, and in particular because of the size of the clean oil and dirty oil buffer reservoirs. This volume obligates recycling facility equipment to be concentrated at a level lower to the rolling mill, in the cellar, and not on the same level as the rolling mill.

Thus, in state of the art recycling facilities, only the filtration system (that is, plate filtration devices) is installed on the same level as that of the rolling mill, and is easily accessible, the other equipment, namely the dirty oil reservoir, the clean oil reservoir, as well as the different pumps, exchangers and valves thus being installed in a cellar of consequent size and dedicated to the integration of all this equipment.

According to the inventor's observations, this wide cellar represents, during the building of the rolling mill workshop, a significant cost, because of the civil engineering costs, particularly because of the volume of materials (concretes), as well as fire safety arrangements, as well as the size of the cellar's ventilation system. Another disadvantage of such a design is that the equipment present in the cellar is often not very accessible, for maintenance.

According to the inventor's observations, such a recycling facility design, such as it has been known since the 1970s and still respected up to today, can be improved.

SUMMARY OF THE INVENTION

The aim of this invention is to offer a plate filtration device, of new design, which alleviates the aforementioned disadvantages, and in particular, which allows a substantial reduction in costs of the facility, even a better access to equipment of the recycling facility.

Other aims and benefits of the invention will appear during the description which will follow, which is only given for information purposes.

Also, the invention concerns an oil filtration device, comprising:
  a tank comprising an inlet for oil to be filtered, as well as a lid
  at least one plate element, even multiple plate elements, superimposed in the internal volume of the tank, removable, able to be removed outside of the tank by the upper opening of the lid, each one of the plate elements holding filtration cartridges that can be removed, each one of the plate elements, hollow, constituting a collector for the oil filtered by the cartridges of said plate element, each one of the plate elements comprising a filtered oil outlet connected so that it can be removed, to a corresponding outlet of the tank by the intermediary of a connector.

According to the invention:
  there are between one and three plate elements,
  the total number of filtration cartridges of the device is between 500 and 3,000 cartridges,
  and in such a way to allow a nominal filtration flow between 1,000 l/min and 4,000 l/min.

According to an embodiment, the number of plate elements is equal to three, the number of cartridges per plate element being preferably between 500 and 1,000, by example between 700 and 900, the nominal filtration flow of the filtration device between 3,000 l/min and 4,000 l/min.

According to an alternative, the number of plate elements is equal to two, the number of cartridges per plate element being preferably between 500 and 1,000, for example between 700 and 900, the nominal filtration flow of the filtration device being between 2,000 l/min and 3,000 l/min.

Again, according to another alternative, the number of plate elements is equal to one, the number of cartridges per plate element being preferably between 500 and 1,000, for example between 700 and 900, the nominal filtration flow of the filtration device being between 1,000l/min and 2,000 l/min.

According to the optional characteristics of the invention, taken by themselves or as a combination:
  the useful volume of the tank of the filtration device is less than 15 m$^3$, preferably 9 m$^3$ and 12 m$^3$ when said device has three plate elements;
  the length of the cartridges is between 16 inches (40.64 cm) and 24 inches (60.96 cm), preferably between 17 inches (43.18 cm) and 24 inches (60.96 cm), such as 20 inches (50.80 cm);
  the diameter of the tank is between 1.5 meters and 2.3 meters;
  the height of said tank is less than 4 meters, preferably between 1.5 and 4 meters, in particular when said device has three plate elements;

The invention also concerns a recycling and oil filtration facility of a rolling mill presenting a circuit, comprising, successively, according to the direction of oil flow:
  a dirty oil reservoir 2,
  a filtration system 100 comprising one or several oil filtration devices 1 according to the invention
  a clean oil reservoir 3.

According to the optional characteristics of the facility, taken by themselves or as a combination:
  said dirty oil reservoir being located at a lower level to the rolling mill, in a cellar, the clean oil reservoir, and the filtration system are located outside of the cellar, at a higher level;
  said dirty oil reservoir is located in said cellar, in the immediate proximity of said rolling mill;
  the facility of which the circuit presents a pumping system and a valve system to control the clean oil flow arriving at the rolling mill, as well as an exchanger system, intended to control the temperature of the clean oil, said pumping system, said valve system and the exchanger system being located outside of the cellar, at a higher level;
  the rolling mill is a 20-Hi rolling mill.

The invention again concerns the use of a filtration and recycling facility according to the invention for a rolling mill requiring a rolling oil flow of between 4,000 l/min and 27,000 l/min.

BRIEF DESCRIPTION OF THE DRAWINGS

The invention will be best understood upon reading the following description, accompanied by its appended drawings, amongst which:

FIG. 2 is a view of a five-plate filtration device, such as known from the state of the art, FIG. 2a is a photo of a plate with its cartridges of a device of the type in FIG. 2, FIG. 3 is a view of the floor layout of the equipment of a recycling facility according to the state of the art in FIG. 1, FIGS. 4 and 5 are respectively views comparing a filtration device according to the state of the art (FIG. 4) and a filtration device according to the invention (FIG. 5), FIGS. 6 and 7 are a view of a new floor layout of the equipment of a recycling facility according to the invention.

DETAILED DESCRIPTION OF THE PREFERRED EMBODIMENTS

Figure 1:
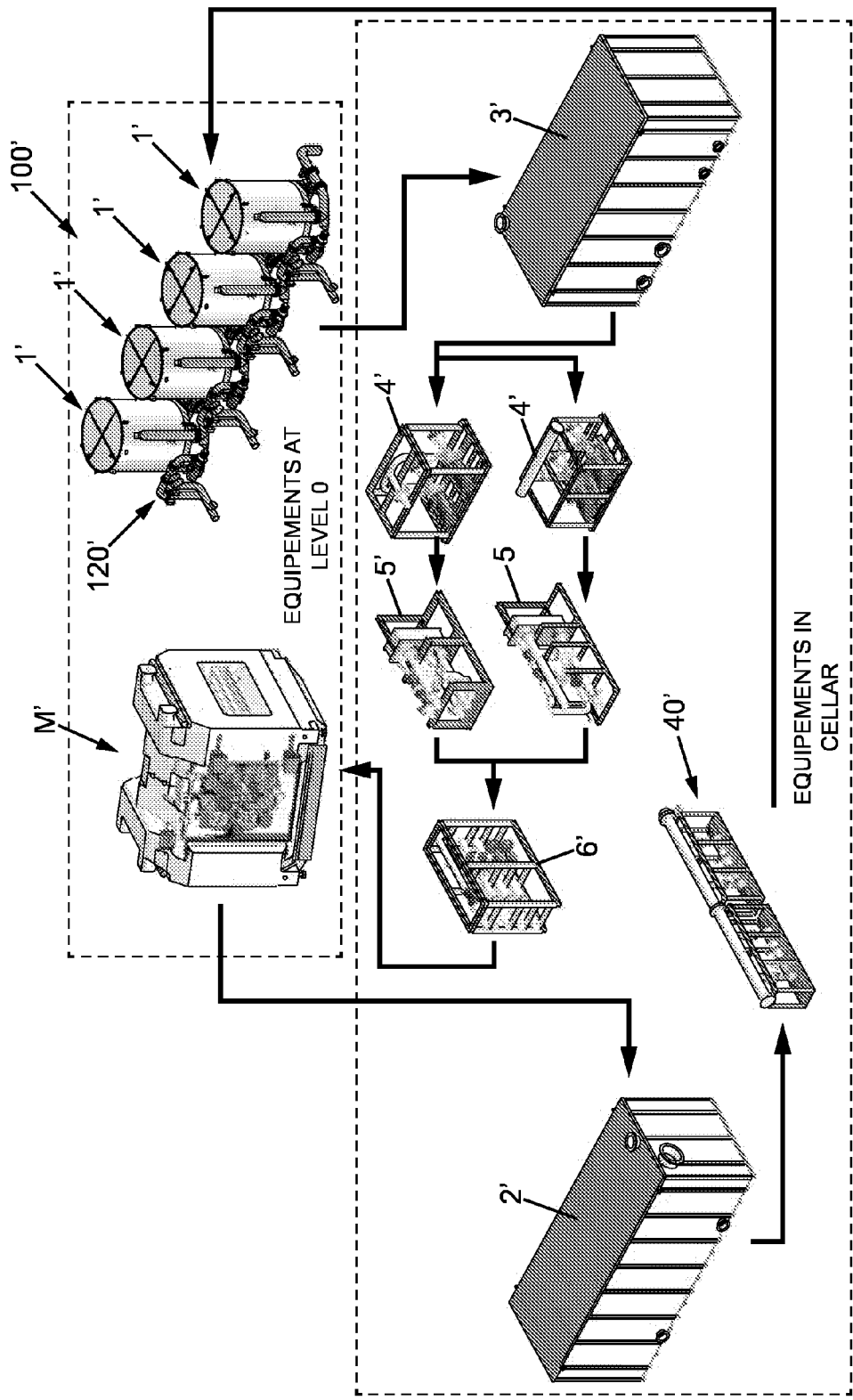
FIG. 1 is a diagrammatic view of an oil recycling facility of a 20-cylinder rolling mill, such as known from the state of the art.

We start firstly, by describing the architecture of a recycling and rolling oil filtration facility, such as known from the state of the art, and such as illustrated in FIGS. 1 to 4 for a 20-Hi rolling mill M'.

The facility presents a circuit, illustrated diagrammatically in FIG. 1 and which comprises, between a dirty oil outlet of the rolling mill and a clean oil inlet, according to the normal direction of oil flow:
- a dirty oil reservoir 2',
- a pumping system 110' (supplying the filtration system),
- a filtration system 100' comprising the filtration devices and pumps,
- a pumping system 120' (extraction from the filtration system),
- a clean oil reservoir 3',
- a pumping system 4' (for the rolling mill M'),
- an exchanger system 5',
- a valve system 6'.

In such a circuit, the dirty oil is collected in the dirty oil reservoir 2, before being channeled, pushed by the pumping system 110' into the filtration system 100'. The filtered oil is then stored in the clean oil reservoir 3'. The pumping system 4' and valve system 6' then supplies the rolling mill M' according to the nominal flow desired in the rolling mill. The exchanger system 5, in particular a water/oil-type, enables the desired temperature of the oil to be adjusted. The illustrated facility is sized to ensure a constant fluid flow to the rolling mill, typically between 4,000 l/min and 27,000 l/min, the filtration system 100' comprising multiple plate filtration devices 100' (four of them in FIG. 1), of the type of the manufacturer SUPAMIC, and known since the 1970s, in this type of recycling facility.

Such a filtration device comprises, such as illustrated in FIG. 2, a tank 10', typically cylindrical inside which several "plates" are superimposed, removable, marked 11', 12', 13', 14' and 15', spread out over the height of the tank, and stacked on top of each other using base systems. Each one of the plates is a hollow element, whereon a large number of filtration cartridges are fixed, parallel, typically by screwing from the upper edge of the cartridge onto the corresponding threaded parts of the plate.

The tank 10' comprises an opening for the dirty oil 16', lower and an overflow opening 17', located above the plates. Filtration is achieved through the filtering medium of the different cartridges, from outside to inside, the oil filtered by the cartridges being collected in each one of the plates, which are hollow elements, then led to a plate outlet for clean oil. The oil outlets of different plates are respectively connected, watertight, at openings spread out over the height of the tank, using flange sets. The different outlets 18' of filtered oil join together in one same vertical pipe 19'.

To the inventor's knowledge, in order to limit the number of filtration devices, and with the aim of limiting the costs of the facility, it is useful for a person skilled in the art to choose high filtration capacity filtration devices, with a higher capacity than 4,000 l/min and which always have four or five plates.

FIG. 4 illustrates such a five-plate filtration device presenting the following characteristics:
- Number of plates: 5,
- Length of cartridges: 13 inches (that is 33.02 cm),
- Number of cartridges: 4,160 (832 cartridges per plate),
- Height of the tank device: 6.1 meters,
- Useful volume (oil): 18 m$^3$,
- Duration of unclogging: 30 minutes.

Such a filtration device presents a filtration capacity higher than 4,000 l/min. The filtration system of a recycling and filtration facility equipping a rolling mill, of which the oil flow is 12,000 l/min only requires three devices 1', according to FIG. 4, arranged parallel, and such as illustrated in FIG. 3.

The filtration cartridges used often comprise a nylon or fibreglass-based filtering medium. In order to extend the lifespan of the cartridges, back flushable-type filter cartridges are used.

The unclogging of cartridges is carried out at regular time intervals, and is implemented, on plate filtration devices, one by one. For this purpose, a fluid back flush is implemented (compressed air) on one of the plate filtration devices, and while the other plate filtration devices, positioned parallel, ensure the filtration of the rolling oil. For each device, the unclogging is implemented plate by plate, and not simultaneously on all the cartridges of different plates.

The invention is born of the inventor's desire to fundamentally change the sizing of recycling facilities such as known from the state of the art, as well as the floor layout of the different equipment that comprises it.

The invention is born of the observation by the inventor that four or five-plate filtration devices from the state of the art are beneficial, in that, with a significant filtration capacity, they enable the number of filtration devices needed for the facility to be reduced, but however present the disadvantage of a significant unclogging duration, because of the significant number of plates per device.

Further still, the invention is born of the observation by the inventor that this significant unclogging duration, as well as the fact of presenting a number of devices in parallel with the smallest possible device obligates the dirty oil reservoir 2' and the clean oil reservoir 3' to be oversized, which then obligates a person skilled in the art to arrange this equipment in a wide dedicated cellar, as represented in FIG. 3.

Indeed, the volume of these two reservoirs is a direct relation to the volume T×ΔD:
- the parameter T represents the time needed to unclog the cartridges of a filtration device and,
- the parameter ΔD, the fall in filtration flow.

According to the inventor's observations, the higher the number of plates, the larger the parameters T and ΔD will be. Indeed, the unclogging duration is directly proportional to the number of plates. Moreover, and the higher the filtration capacity of each device, the lesser devices there will be, and therefore the more of a fall in ΔD flow there will be, when one of the devices is obstructed for the implementation of back flush cleaning.

Therefore, the invention aims to design and size a plate-type filtration device in a way to substantially reduce the overall cost of the facility.

According to the invention, the filtration device is design in such a way to be able to substantially reduce the volumes of dirty oil and clean oil reservoirs.

Also, the invention relates to an oil filtration device 1, comprising:

- a tank 10 comprising an inlet for oil to be filtered, as well as a lid
- at least one plate element, even multiple plate elements 11, 12, 13, removable, superimposed in the internal volume of the tank, able to be removed outside of the tank 10 by the upper opening of the lid, each one of the plate elements holding filtration cartridges that can be removed, each one of the plate elements, hollow, constituting a collector for the oil filtered by the cartridges of said plate element, each one of the plate elements comprising a filtered oil outlet connected so that it can be removed, to a corresponding outlet of the tank by the intermediary of a connector.

The plate elements 11, 12, 13 each comprising a hollow body acting as a collector for filtered oil, as well as an outlet intended to be connected to a corresponding opening of the tank. The connection can be made, according to the state of the art, by means of a flange set.

Fixing the filtration cartridges is done, preferably on the soffit of each plate element, for example by screwing, by means of jointly binding threaded parts. The filtration cartridges achieve oil filtration in parallel with the functioning flow given by the manufacturer of the filtration cartridge, from the outside to the inside of the cartridge.

Each plate element 11, 12 or 13 can again comprise, according to an embodiment of the base extending from the hollow body up to below the lower edges of the filtration cartridges. This base enables, in particular, the plate elements to be stacked on top of each other: the base of said lowest plate element supports on the bottom of the tank, the base of the upper plate elements supporting respectively on the upper faces of the corresponding lower plates.

The device can again comprise an overflow opening, located above the plate elements and enabling the non-filtered oil to be recycled up to the inlet opening of the tank.

According to the invention:
- there are between one and three plate elements 11, 12, 13,
- the total number of filtration cartridges of the device is between 500 and 3,000 cartridges,
- and in such a way to allow a nominal filtration flow between 1,000 l/min and 4,000 l/min.

According to an embodiment (in particular illustrated), the number of plate elements is equal to three, the number of cartridges per plate element being preferably between 500 and 1,000, the nominal filtration flow between 3,000 l/min and 4,000 l/min.

According to an alternative (not illustrated), the number of plate elements is equal to two, the number of cartridges per plate element being preferably between 500 and 1,000, the nominal filtration flow between 2,000 l/min and 3,000 l/min.

Again, according to another alternative (not illustrated), the number of plate elements is equal to one, the number of cartridges per plate element being preferably between 500 and 1,000, the nominal filtration flow between 1,000 l/min and 2,000 l/min.

According to a first characteristic of the invention, the number of plate elements is only three (or less) per filtration device, and not four or five, such as known in recycling and filtration facilities from the state of the art.

According to the inventor's observations, reducing the number of plate elements to three as a maximum (and not four or five according to the state of the art), enables all the filtration cartridges of the device to be unclogged, by implementing three fluid back flushes as a maximum only (that is, compressed air), and for example, three back flushes successively on the three plate elements 11, 12, 13 of a three-plate device. The number of back flushes implemented corresponds to the number of plate elements of the device.

Thus, advantageously, a substantial reduction in the unclogging duration is obtained, compared with the filtration device from the state of the art, which requires the implementation of at least four back flushes, even five.

This reduction in the number of plate elements, moreover enables the height of the device to be limited, and in particular, the height of the tank.

The filtration device according to the invention is also characterised by its significant filtration capacity, in other words, between 1,000 l/min and 4,000 l/min, which enables this number to not be increased too much in a recycling and filtration facility: this filtration capacity of the device is given by the number of cartridges multiplied by the functioning flow of the filtration cartridge (given by the manufacturer). In this regard, the total number of cartridges per device can be between 500 and 3,000.

More specifically, the total number of cartridges can be:
- between 500 and 1,000 for a one-plate-element filtration device,
- between 1,000 and 2,000 for a two-superimposed-plate-element filtration device,
- between 1,500 and 3,000 for a three-plate-element filtration device.

The filtration devices can be cleaned by back flush: the filtering medium can be nylon or fibreglass-based.

The dimensions of the tank, in particular the diameter of the tank 10 is preferably less than or equal to 2.3 meters, in particular between 1.5 meters and 2.3 meters, and in such a way to be able to channel the device by standard-sized container, of which the interior dimensions are as follows:
- width: 2.33 m;
- height: 2.38 m;
- door passage height: 2.30 m;
- length: 5.905 m or 12.04 m.

The height of the tank can be less than 5 meters, preferably, less than 4 meters such as, for example, 3.1 meters, in particular between 3 and 4 meters when the device comprises three plate elements 11, 12, 13.

The height of the tank can be between 2 meters and 3 meters when the device has two plate elements.

The height of the tank can be between 1 meter and 2 meters when the device has one single plate element.

In order to preserve good filtration capacities, the filtration cartridges can be of a length longer than or equal to 16 inches, preferably of a length between 16 inches (40.64 cm) and 24 inches (60.96 cm), further still preferably between 17 inches (43.18 cm) and 24 inches (60.96 cm), for example, between 18 inches (45.72 cm) and 22 inches (55.88 cm), such as 20 inches (50.80 cm). As an example, the nominal functioning flow of a 20-inch filtration cartridge is 1.54 l/min (cartridges from the manufacturer Hydac or Pall).

The useful volume (oil holding volume) of the tank of the device can be less than 15 $m^3$, and for example:
- between 9 $m^3$ and 12 $m^3$ when the device has three plate elements 11, 12, 13, between 6 m³ and 9 m³ when the device has two plate elements,
between 3 m³ and 6 m³ when the device has one single plate element.

Limiting the useful volume of the tank plays a part in reducing the volume of the dirty oil reservoir, which often must enable all the oil contained in the tanks of the different filtration devices to be emptied within it.

We give as a non-exhaustive example, in comparative table no. 1 below, an example of a filtration device according to the state of the art which is used in a recycling and filtration facility, and its replacement according to the invention.

|  | Filtration device 1' (State of the art) | Filtration device 1 (Invention) |
|---|---|---|
| Cartridge length | 13 inches (that is 33.02 cm) | 20 inches (that is 50.08 cm) |
| Number of cartridges | 4,160 | 2,223 |
| Device diameter (tank) | 2.4 meters | 2.2 meters |
| Device height (tank) | 6.1 meters | 3.1 meters |
| Number of plate elements | 5 | 3 |
| Useful device volume | 18 m³ | 15 m³ |
| Unclogging duration | 29.7 minutes | 18.5 minutes |

The filtration system of a rolling mill requiring a rolling oil flow of 12,000 l/min will only require three filtration devices 1' according to the state of the art, assembly parallel, while four devices 1 according to the invention will be necessary.

The invention also concerns an oil recycling and filtration facility of a rolling mill presenting a circuit comprising, successively, according to the oil flow direction:
a dirty oil reservoir 2,
a filtration system 100 comprising one or several oil filtration devices 1 according to the invention,
a clean oil reservoir 3.

The filtration system 100 preferably comprises several oil filtration devices 1 according to the invention, able to achieve oil filtration in parallel. The number of devices depends on the oil flow to the rolling mill, typically between 4,000 l/min and 27,000 l/min and is preferably higher than or equal to 3.

The facility can also comprise a pumping system 4 and a valve system 6 to control the clean oil flow arriving at the rolling mill M, below the clean oil reservoir 3, as well as an exchanger system 5, in particular of water/oil, intended to control the temperature of clean oil. The facility can again comprise a pumping system 110 above the devices 1 of the filtration system 100 and intended to push the dirty oil up to the filtration system, a pumping system 120 below the devices 1 of the filtration system 100 and intended to suck the oil through the filtering medium.

The facility again comprises another unclogging system, implementing a back flush (compressed air), device 1 by device 1, and while the other plate filtration devices, positioned parallel, ensure the filtration of rolling oil. For each device, the unclogging is performed plate by plate, and not simultaneously on all the cartridges of the different plates.

The devices according to the invention enabling the sizing of the clean oil reservoir 3 and the dirty oil reservoir 2 to be substantially reduced, the invention allows other floor configurations to be considered than that imposed by the state of the art.

Thus, said dirty oil reservoir 2 can be located at a lower level to the rolling mill (M), in a cellar in particular, in order to recover the oil using gravity. However, and according to the invention, the clean oil reservoir 3 (as well as, in particular, the filtration system 100), can advantageously be located outside of the tank, at a higher level. Likewise, said pumping system 4, said valve system 6, even the exchanger system 5 can be located outside of the cellar, at a higher level, such as illustrated in FIG. 7.

The decrease of the dimensions of the dirty oil reservoir 2, advantageously allows this to be positioned in a cellar, such as illustrated in FIG. 6, possibly slightly bigger, advantageously in the immediate proximity of the rolling mill, which is often present to allow access to the lower actuator system of the rolling mill. This tank also enables the pumping system 110 of the filtration system to be accommodated.

The filtration and recycling facility according to the invention finds a specific application for 20-cylinder rolling mills, still called 20-Hi by a person skilled in the art.

Comparative table no. 2 below, illustrates the simulated gains, for a rolling mill of which the oil flow is 12,000 l/min, for a facility comprising four devices 1 according to the invention (with three plate elements), such as defined in table no. 1, and of which the floor layout is improved according to FIGS. 6 and 7, and in comparison with a facility according to the state of the art, comprising three devices (with five plate elements), according to the state of the art, such as defined in table no. 1, and according to the floor layout known from the state of the art and illustrated in FIG. 3.

| Facility | State of the art | Invention | Delta Gain |
|---|---|---|---|
| Number of cartridges | 12,480 | 8,892 | −7% |
| Volume of oil | 295 m³ | 172 m³ | −42% |
| Floor footprint (including rolling mill) | 1,800 m² | 1,300 m² | −28% |
| Volume of concrete | 5,200 m³ | 3,400 m³ | −35% |
| $CO_2$ mass (Tank fire safety) | 2,898 kg | 966 kg | −67% |
| Annual cellar ventilation energy | 253,440 kW | 86,400 Kw | −66% |

Moreover, the invention enables substantial gains on costs of cartridges, pumps, valves, reservoirs of the facility and the filtration system which are thus optimised.

Most of the equipment, including filtration devices, can be transported by standard containers, and unlike the same equipment from the state of the art, which requires exceptional transport.

Of course, other embodiments would have been able to be considered by a person skilled in the art, without actually moving away from the framework of the invention defined by the claims below.

NOMENCLATURE

Invention (FIGS. 5 to 7):
1. Three-plate filtration device,
10. Tank,
11, 12, 13. Plate elements,
2. Dirty oil reservoir,
3. Clean oil reservoir,
4. Pumping system (rolling mill),
5. Exchanger system,
6. Valve system, 100. Filtration system,
110. Pumping system (supplying the filtration system),
120. Pumping system (extracting the oil from the filtration system),
M. Rolling mill.
   State of the Art (FIGS. 1 to 4):
1'. Five-plate filtration device,
10'. Tank,
11'. 12', 13', 14', 15'. Plate elements,
16'. Dirty oil inlet opening,
17'. Overflow opening,
18'. Filtered oil outlets,
19'. Filtered oil pipe,
2'. Dirty oil reservoir,
3'. Clean oil reservoir,
4'. Pumping system (rolling mill M'),
5'. Exchanger system,
6'. Valve system,
100'. Filtration system,
110'. Pumping system (supplying the filtration system),
120'. Pumping system (extracting the oil from the filtration system),
M'. Rolling mill.

The invention claimed is:

1. An oil recycling and filtration facility of a rolling mill, presenting a circuit comprising, successively, according to an oil flow direction in said facility:
   a dirty oil reservoir (2);
   a filtration system (100) comprising at least four oil filtration devices (1) configured to achieve oil filtration in parallel; and
   a clean oil reservoir (3),
   wherein each oil filtration device (1), comprises:
      a tank (10) comprising an inlet for oil to be filtered, as well as a lid, and
      at least one plate element, or multiple superimposed plate elements, in the internal volume of the tank, removable, able to be removed outside of the tank by the upper opening of the lid, each one of the plate elements holding filtration cartridges that can be removed, each one of the plate elements, hollow, constituting a collector for the oil filtered by the cartridges of said plate element, each one of the plate elements comprising a filtered oil outlet connected so that said plate element can be removed, to a corresponding outlet of the tank by the intermediary of a connector,
   wherein, for each oil filtration device:
      the tank (10) of the filtration device (1) has a useful volume of less than 15 m³,
      there are between one and three plate elements (11, 12, 13), and
      the total number of filtration cartridges of the device is between 500 and 3,000 cartridges, and in such a way that each filtration device is configured to have a nominal filtration flow between 1,000 l/min and 4,000 l/min, and
   wherein said dirty oil reservoir (2) is located in a cellar at a lower level to the rolling mill (M), the clean oil reservoir (3) and the filtration system (100) are located outside of the cellar at a higher level, said dirty oil reservoir (2) located in said cellar in an immediate proximity of said rolling mill (M).

2. The facility according to claim 1, wherein the number of plate elements (11, 12, 13) is equal to three, the nominal filtration flow being between 3,000 l/min and 4,000 l/min.

3. The facility according to claim 1, wherein the number of plate elements is equal to two, the nominal filtration flow being between 2,000 l/min and 3,000 l/min.

4. The facility according to claim 1, wherein the number of plate elements is equal to one, the nominal filtration flow being between 1,000 l/min and 2,000 l/min.

5. The facility according to claim 2, wherein the useful volume of the tank (10) of the filtration device (1) is between 9 m³ and 12 m³ when the device has three plate elements (11, 12, 13).

6. The facility according to claim 1, wherein the length of the cartridges is between 16 inches (40.64 cm) and 24 inches (60.96 cm).

7. The facility according to claim 1, wherein the diameter of the tank (10) is between 1.5 meters and 2.3 meters.

8. The facility according to claim 1, wherein the height of said tank is less than 4 m when the device has three plate elements (11, 12, 13).

9. The facility according to claim 1, of which the circuit presents a pumping system (4) and a valve system (6) to control the clean oil flow arriving at the rolling mill, as well as an exchanger system (5), intended to control the temperature of the clean oil, wherein said pumping system (4), said valve system (6) and the exchanger system (5) are located outside of the cellar, at a higher level.

10. The facility according to claim 1, wherein the rolling mill is a 20-Hi rolling mill.

11. A method of recycling and filtering oil for a rolling mill, comprising:
   providing the facility of claim 1; and
   operating the facility to recycle and filter said oil;
   wherein the facility is constructed and arranged to recycle and filter a rolling oil flow of between 4,000 l/min and 27,000 l/min.

12. The facility of claim 2, wherein the number of cartridges per plate element is between 500 and 1,000.

13. The facility of claim 3, wherein the number of cartridges per plate element is between 500 and 1,000.

14. The facility of claim 4, wherein the number of cartridges per plate element is between 500 and 1,000.

15. The facility according to claim 2, wherein the length of the cartridges is between 16 inches (40.64 cm) and 24 inches (60.96 cm).

16. The facility according to claim 3, wherein the length of the cartridges is between 16 inches (40.64 cm) and 24 inches (60.96 cm).

17. The facility according to claim 4, wherein the length of the cartridges is between 16 (40.64 cm) and 24 inches (60.96 cm).

18. The facility according to claim 3, wherein the useful volume of the tank (10) of the filtration device (1) is between 6 m³ and 9 m³ when the device has two plate elements.

19. The facility according to claim 4, wherein the useful volume of the tank (10) of the filtration device (1) is between 3 m³ and 6 m³ when the device has one single plate element.

* * * * *